Figure 1:
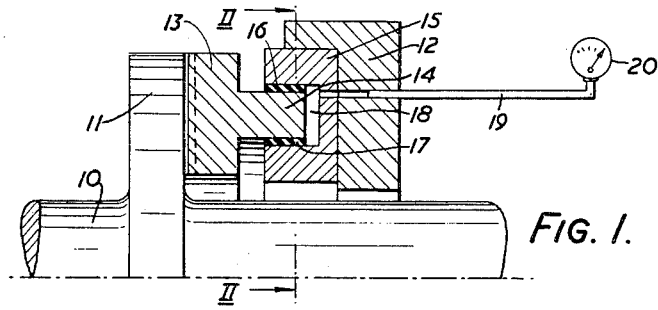

Nov. 7, 1961  J. D. S. DE GUERIN  3,007,749
THRUST BEARINGS
Filed Feb. 5, 1959  2 Sheets-Sheet 1

INVENTOR
JOSEPH DUDLEY S. deGUERIN

BY
Watson, Cole, Grindle & Watson
ATTORNEYS

United States Patent Office 3,007,749
Patented Nov. 7, 1961

3,007,749
THRUST BEARINGS
Joseph Dudley Shuldham de Guerin, Whitton, England, assignor to D. Napier & Son Limited, London, England, a company of Great Britain
Filed Feb. 5, 1959, Ser. No. 791,478
Claims priority, application Great Britain Apr. 21, 1958
6 Claims. (Cl. 308—160)

This invention relates to thrust bearings of the kind comprising a supporting member carrying a rigid annular bearing element surrounding the axis of the bearing. Normally the supporting member will be fixed to a non-rotary housing and the opposed bearing surface will be in the form of a flange on a rotary shaft and the invention is primarily applicable to such constructions, but can also be applied to arrangements where the supporting member is carried on a rotary shaft and the opposed bearing surface is on a fixed non-rotary housing.

In such thrust bearings it is important that the bearing face of the bearing element should be accurately aligned and parallel with the face of the opposed bearing element and this alignment may be upset by small manufacturing tolerances or by relative movement between the rotary shaft and the fixed housing. It is an object of the invention to provide an improved thrust bearing which will compensate for any such misalignment and it is a further object of the invention to provide means for measuring the thrust transmitted.

According to the invention a thrust bearing comprises a supporting member carrying a rigid annular bearing element surrounding the axis of the bearing, the bearing element being supported from the supporting member by at least one piston and cylinder assembly having its axis parallel to the axis of the bearing, the piston and cylinder having adjacent surfaces between which is interposed an annular resilient element of elastomeric material.

Preferably the resilient element is of appreciable length in an axial direction, but of restricted thickness in a radial direction, and is bonded or otherwise firmly attached to the surfaces of the piston and cylinder.

Thus the resilient element will effectively locate the bearing element relative to the supporting member while allowing small relative movement between these parts. Radial loads, if any, will be transmitted by radial compression forces in the resilient element while axial movements will result in shear stresses being set up therein. The bearing element will thus be able to move bodily in an axial direction, or to more limited extent in a radial direction, and will also be able to tilt bodily about an axis normal to the axis of the bearing.

In a preferred form of the invention the piston and cylinder are of annular form, concentric with the axis of the bearing.

Moreover preferably the closed end of the annular cylinder is filled with a liquid and a fluid pressure connection is provided between this closed end of the cylinder and a device sensitive to fluid pressure to provide an indication of the pressure in the cylinder and hence of the thrust transmitted by the bearing.

The term "liquid" as used herein is to be understood to include not only true liquids, but also substances such as greases or soft rubber having liquid flow properties, but which are substantially incompressible.

In an alternative construction according to the invention, the bearing element is supported from the supporting member by a series of such piston and cylinder assemblies, spaced about the axis of the bearing.

In such case preferably the closed ends of the cylinders are filled with liquid and are connected to one another by a fluid passage and are connected to a fluid pressure sensitive device which provides an indication of the pressure in the cylinders and hence of the thrust transmitted by the bearing.

It will be appreciated that the invention is also applicable to thrust bearings including ball or roller bearings between the bearing element and the opposing bearing surface.

Figure 2:
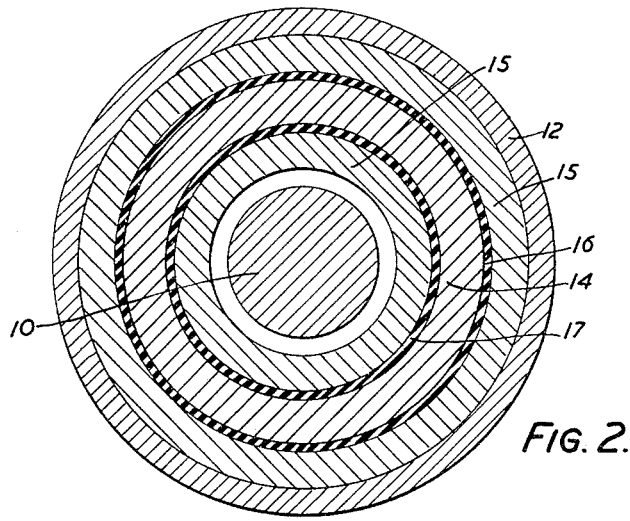
Figure 3:
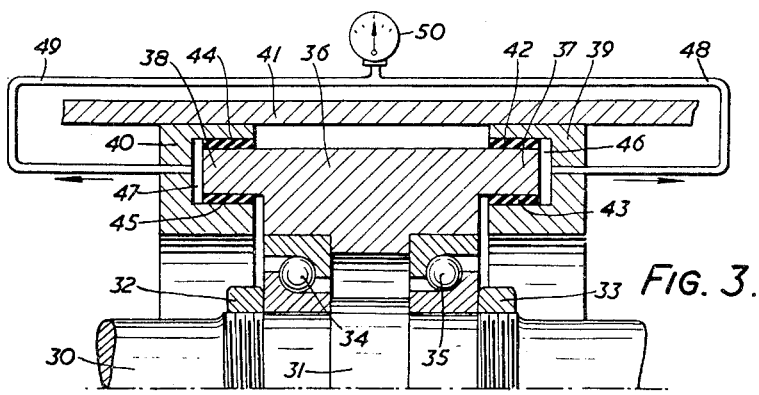
Figure 4:
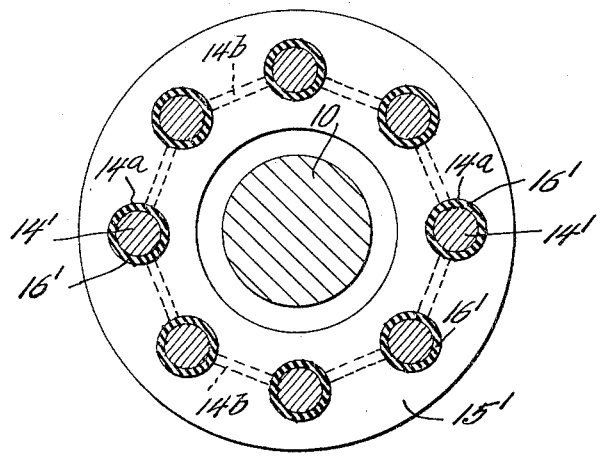

The invention may be performed in various different ways and three specific embodiments will now be described with reference to the accompanying drawings, in which FIGURE 1 is a sectional side elevation through a thrust bearing assembly according to the invention, FIGURE 2 is a cross sectional view on the line II—II in FIGURE 1, FIGURE 3 is a similar sectional side elevation through another example of the invention, and FIGURE 4 is a cross-sectional view corresponding to FIGURE 2 of a still further example of the invention.

In the example illustrated in FIGURES 1 and 2 a shaft 10 is formed with a radial flange 11 while a fixed housing 12 surrounds the shaft and a rigid annular bearing element 13 is supported from this housing and bears against the adjacent face of the flange 11. The face of the bearing element 13 remote from the flange 11 is formed with an annular projection 14 which constitutes an annular piston and this piston is arranged to lie partly within an annular cylinder formed in a supporting member 15 connected to the housing 12. Two cylindrical rubber bushes or sleeves 16 and 17 are inserted between the adjacent cylindrical faces of the annular piston 14 and the annular chamber in the member 15 and these bushes may be bonded to the two parts to form a positive fluid tight seal while acting also as the resilient elements referred to. The closed end of the chamber 18 is filled with a hydraulic liquid and a pressure conduit 19 communicates between this chamber and a pressure gauge 20.

It will be seen that the two rubber bushes or sleeves 16, 17 act to provide general location of the bearing element 13 while permitting small movements in a radial or axial direction or a combination of such movements, which are resisted by the stresses set up in the rubber. The axial thrust transmitted between the flange 11 and the element 13 will be resisted by shear stresses set up in the rubber bushes and the resulting axial displacement of the piston 14 will cause a corresponding displacement of liquid from the chamber 18 which will give a corresponding reading at the gauge 20 from which the total thrust transmitted can be assessed.

In a modification of the example described above, and as shown in FIGURE 4, the bearing element 13 (not shown) is of rigid annular construction, as in FIGURES 1 and 2, but instead of being provided with a complete annular projection 14, as in the embodiment of FIGURES 1 and 2, it is formed with a series of separate cylindrical plungers or pistons 14' spaced apart circumferentially around the axis of the bearing and shown in section only. Each piston lies partly within an individual cylinder 14a formed in the supporting member 15' being mounted therein by means of an individual rubber bush 16'. In this case each of the individual cylinders 14a may be provided with a hydraulic connection 14b to the remaining cylinders to equalize pressure in the cylinders and to a pressure gauge generally as in FIGURE 1. In other respects this modification will be identical to that described above.

In the example illustrated in FIGURE 3 the shaft 30 is formed with a central flange 31 and lock nuts 32, 33 for locating two opposed ball bearing thrust recesses 34, 35. The outer parts of these ball recesses are connected to a rigid annular bearing element 36 which is formed on its opposite axial sides with continuous annular projections 37, 38 constituting annular pistons. These two annular pistons lie partly within annular cylinders formed by supporting members 39, 40 rigidly connected to a fixed housing 41. The pistons 37, 38 are supported in the respective cylinders by means of rubber bushes or sleeves 42, 43, 44, 45 which are bonded to the two adjacent parts as described in the previous example and the closed ends of the two cylinders 46, 47 are filled with a hydraulic liquid and connected through conduits 48, 49 to a hydraulic differential pressure gauge 50 which thus provides a direct reading of the value and direction of the axial thrust transmitted between the shaft and housing.

What I claim as my invention and desire to secure by Letters Patent is:

1. A thrust bearing comprising a supporting member, a rigid annular bearing element surrounding the axis of the bearing, and connecting means between the bearing element and the supporting member including at least one piston and cylinder assembly having its axis parallel to the axis of the bearing, the piston and cylinder being concentrically disposed and spaced radially apart throughout their entire axial extent to permit relative tilting of their axes, and an annular resilient sealing element of elastomeric material interposed in the space between the piston and cylinder.

2. A thrust bearing as claimed in claim 1, in which the resilient element is of appreciable length in an axial direction, but of restricted thickness in a radial direction, and is firmly attached to the surfaces of the piston and cylinder.

3. A thrust bearing as claimed in claim 1, in which the piston and cylinder are of annular form, concentric with the axis of the bearing, said piston having inner and outer radial faces spaced from the respective radial faces of the annular cylinder, one of said annular resilient elements being disposed between each pair of radially spaced faces of the piston and cylinder respectively.

4. A thrust bearing as claimed in claim 3, in which one end of the cylinder is closed, the closed end of the annular cylinder is filled with a liquid and including a pressure sensitive device and a fluid pressure connection between this closed end of the cylinder and the pressure sensitive device to provide an indication of the pressure in the cylinder and hence of the thrust transmitted by the bearing.

5. A thrust bearing as claimed in claim 1, including a series of such piston and cylinder assemblies, spaced about the axis of the bearing, and each connected between the bearing element and the supporting member.

6. A thrust bearing as claimed in claim 5, in which one end of the cylinder is closed, the closed ends of the cylinders are filled with liquid and are connected to one another by a fluid passage.

References Cited in the file of this patent

UNITED STATES PATENTS

| | | |
|---|---|---|
| 1,169,206 | Sydney | Jan. 25, 1916 |
| 1,421,208 | Gauldie | June 27, 1922 |
| 2,313,486 | Gratzmuller et al. | Mar. 9, 1943 |
| 2,623,361 | Dungler | Dec. 30, 1952 |

FOREIGN PATENTS

| | | |
|---|---|---|
| 784,238 | Great Britain | Oct. 9, 1957 |